April 26, 1938. G. F. YAGER 2,115,186
BROACHING MACHINE
Filed May 6, 1935 3 Sheets-Sheet 1

FIG. I.

INVENTOR
GEORGE F. YAGER
BY
ATTORNEYS

April 26, 1938.   G. F. YAGER   2,115,186
BROACHING MACHINE
Filed May 6, 1935   3 Sheets-Sheet 2

INVENTOR
GEORGE F. YAGER
BY
ATTORNEYS

April 26, 1938.

G. F. YAGER 2,115,186

BROACHING MACHINE

Filed May 6, 1935

INVENTOR
GEORGE F. YAGER
ATTORNEYS

Patented Apr. 26, 1938

2,115,186

UNITED STATES PATENT OFFICE 2,115,186

BROACHING MACHINE

George F. Yager, Toledo, Ohio, assignor to The Bunting Brass & Bronze Company, Toledo, Ohio, a corporation of Ohio Application May 6, 1935, Serial No. 20,104

21 Claims. (Cl. 90—33)

This invention relates generally to broaching apparatus and refers more particularly to improvements in broaching machines of the general character disclosed in my Patent No. 1,962,674, dated June 12, 1934.

One of the principal objects of this invention is to materially expedite production and reduce the cost of manufacture of bushings or like members, by providing a broaching machine rendering it possible to fashion a relatively great number of bushings in a shorter length of time than heretofore though possible with broaching machines of the type employed for this purpose in the past.

Another object of the present invention resides in the provision of a broaching machine having a pair of broaches operable to respectively roughly fashion the interior surface of each bushing, and to thereafter fashion the interior of each bushing to the proper size. In accordance with the present invention, production is materially increased by providing the machine with a plurality of pairs of broaches of the character previously set forth, and by providing means operable in timed relation to the operation of the broaches to successively introduce a bushing into registration with the broaches of each pair.

Another advantageous feature of the present invention resides in the provision of a work holder having means for transferring a bushing blank from the source of supply to a position in registration with one of the roughing broaches and having additional means operable in timed relation to the completion of the function of the roughing broach to transfer the bushing into registration with the cooperating finishing broach.

A further object of this invention resides in the provision of a work holder comprising a pair of bushing engaging clamps for each pair of broaches and movable during the operation of the broaches to locate one clamp of each pair in registration with a loading station and to locate the other clamp of each pair in registration with one of the broaches of each pair to receive the bushing fashioned by the latter broach. This arrangement also appreciably increases production, since it reduces to the minimum the time interval required for each cycle of operation of the machine.

The foregoing, as well as other objects, will be made more apparent as this description proceeds, especially when considered in connection with the accompanying drawings, wherein.

Figure 1:
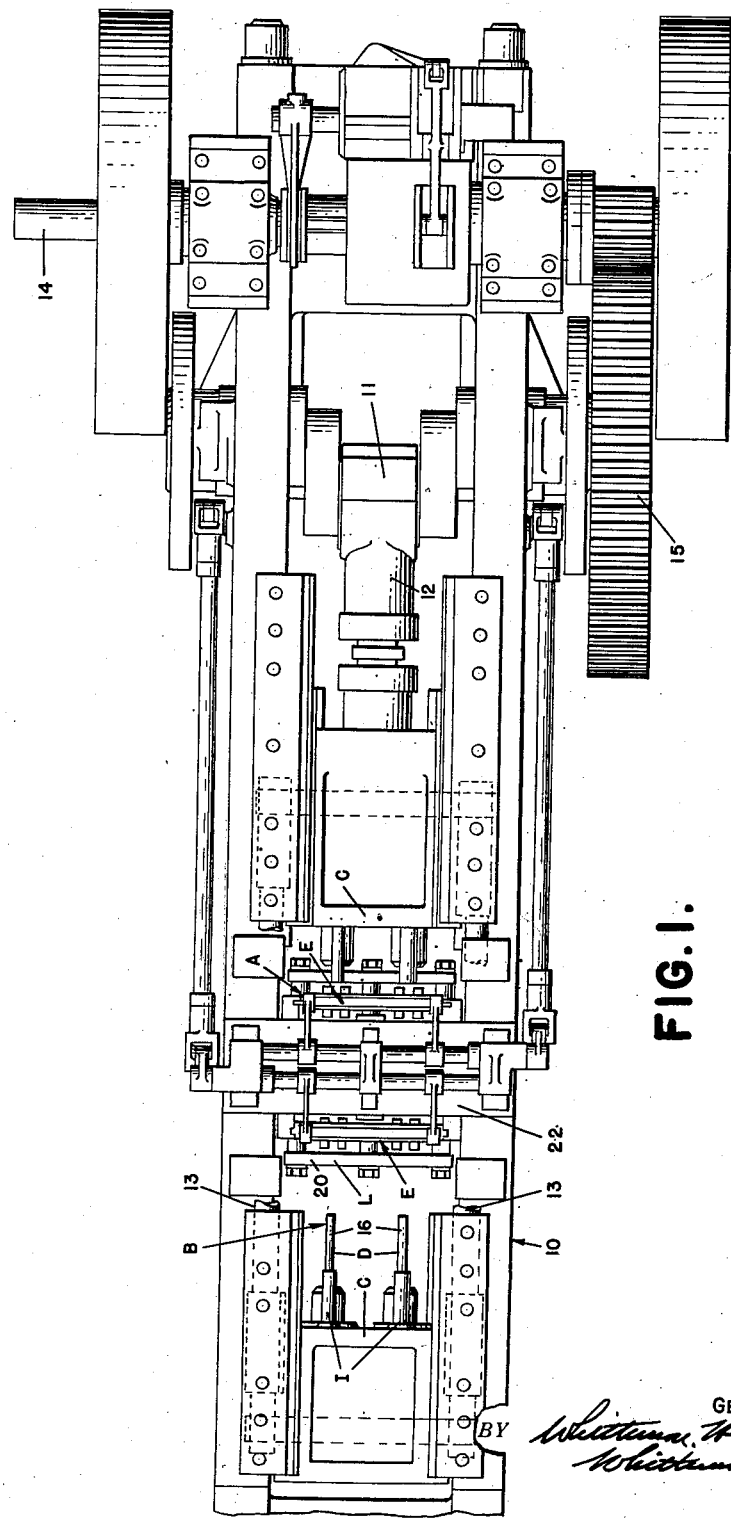
Figure 1 is a plan view of the machine constructed in accordance with this invention.

In general, the broaching machine selected for the purpose of illustration, comprises two opposed broaching assemblies A and B mounted upon the frame of the machine for movement alternately into and out of operative relation with the bushings supported therebetween. In the present instance, the assembly B is identical in construction to the assembly A, and each of the assemblies is provided with a reciprocable crosshead C carrying a plurality of pairs of broaches D. In the present illustrative embodiment of the invention, each of the assemblies is provided with two pairs of broaches D, although it will be understood as this description proceeds that additional pairs of broaches may be provided without departing from the spirit and scope of this invention. Also, in accordance with this invention the upper broach of each pair operates to perform the rough cut upon the bushing blank, while the lower broach of each pair is for the purpose of performing the finishing operation on each of the bushings.

Each of the broaching assemblies A and B is also provided with a work holder, designated generally herein by the reference character E, and having a plurality of pairs of clamps F corresponding in number and spacing to the pairs of broaches D of each assembly. The work holders E are mounted for vertical sliding movement with respect to the broaches, and the clamps F are each provided with cooperating jaws normally yieldably urged in directions toward each other to grip a bushing therebetween, in a manner to be more fully hereinafter set forth. Briefly, each of the pairs of clamps F is provided with an upper clamp G and a lower clamp H having center distances predetermined to correspond exactly to the distance between the axes of the associated pair of broaches, so that the bushing in the lower clamp will assume a position in alignment with the associated finishing broach at the time the bushing in the upper clamp is aligned with the cooperating roughing broach. It will, of course, be understood that the axes of each pair of broaches lie in a common vertical plane including the centers of the clamps associated with each pair of broaches, and in the present instance, the clamps register with the broaches in the lowermost position of the holder E. Each of the broach assemblies A and B is also provided with a plurality of loading plungers I reciprocated by the crossheads for movement relative to the bushing blank supply chutes J. In the present instance, a loading plunger I is associated with each pair of broaches in such a manner that the axis thereof lies in the same vertical plane as the axes of the broaches. It will also be observed from Figure 2, that the axis of each of the loading plungers I is spaced above the axis of the top broach of each pair a distance equal to the spacing between the axes of the latter broaches, so that when the lower clamps are in registration with the upper broaches, the top clamps will assume positions in registration with the loading plungers I.

A brief description of the operation of the apparatus at this point will perhaps assist in understanding the detailed description to follow and inasmuch as both assemblies A and B operate in the same manner only one will be referred to. Assuming that the crosshead C of assembly A is in its outermost position, wherein the broaches D are free from the path of travel of the associated work holder E and assuming that the latter is in its lowermost position wherein the top clamps G register a bushing with the roughing broaches D, and the bottom clamps H register a bushing with the finishing broaches D. When the parts are in the aforesaid position, the crosshead C of assembly A is moved inwardly causing the roughing broaches to transfer the bushings from the clamps G into the relatively fixed aligned split sleeves K and causing the finishing broaches to broach the bushings in the bottom clamps H. As soon as the bushings in the clamps G are transferred, the holder E is moved upwardly (sufficient clearance being provided between the jaws of the clamps to permit the passage of the broaches) to a position wherein the upper clamps G register with the loading plungers I and wherein the lower clamps H register with the roughing broaches D. Continued movement of the crosshead C inwardly (after the upper clamps G have been raised into registration with the loading plungers I) to broach the bushings in the split sleeves K causes the plungers I to transfer bushings from the chutes J into the upper clamps G, whereupon the crosshead C is returned to its outermost position. As the broaches D are moved outwardly by the crosshead C, the bushings on the finishing broaches D are stripped therefrom by a stripper plate L and the bushings on the roughing broaches are similarly stripped by the plate L to assume positions in the aligned clamps H. When the broaches have been completely retracted by the crosshead C, the holder E is moved to its lowermost position, returning the lower clamp H with the bushings previously rough broached into registration with the finishing broaches and moving the upper clamps G with their new bushings into registration with the roughing broaches D. The broaches D are again moved inwardly by the crosshead C and the foregoing operations are repeated.

As previously stated, the broaching assembly B operates in the same manner as assembly A described above, although it will, of course, be understood that the operations will be opposite in phase, since the broaches of assembly B are moved outwardly as the assembly A is moved inwardly. Thus, it will be observed that each pair of clamps operate to successively move a bushing blank from the associated loading station into operative relation to a pair of roughing and finishing broaches, and it will also be observed that the clamps are moved during the broaching operations, so that the time interval is reduced to the minimum.

The modified form of construction is substantially identical in operation to the one previously described, and only differs therefrom in details of construction which will be more fully hereinafter set forth.

Figure 2:
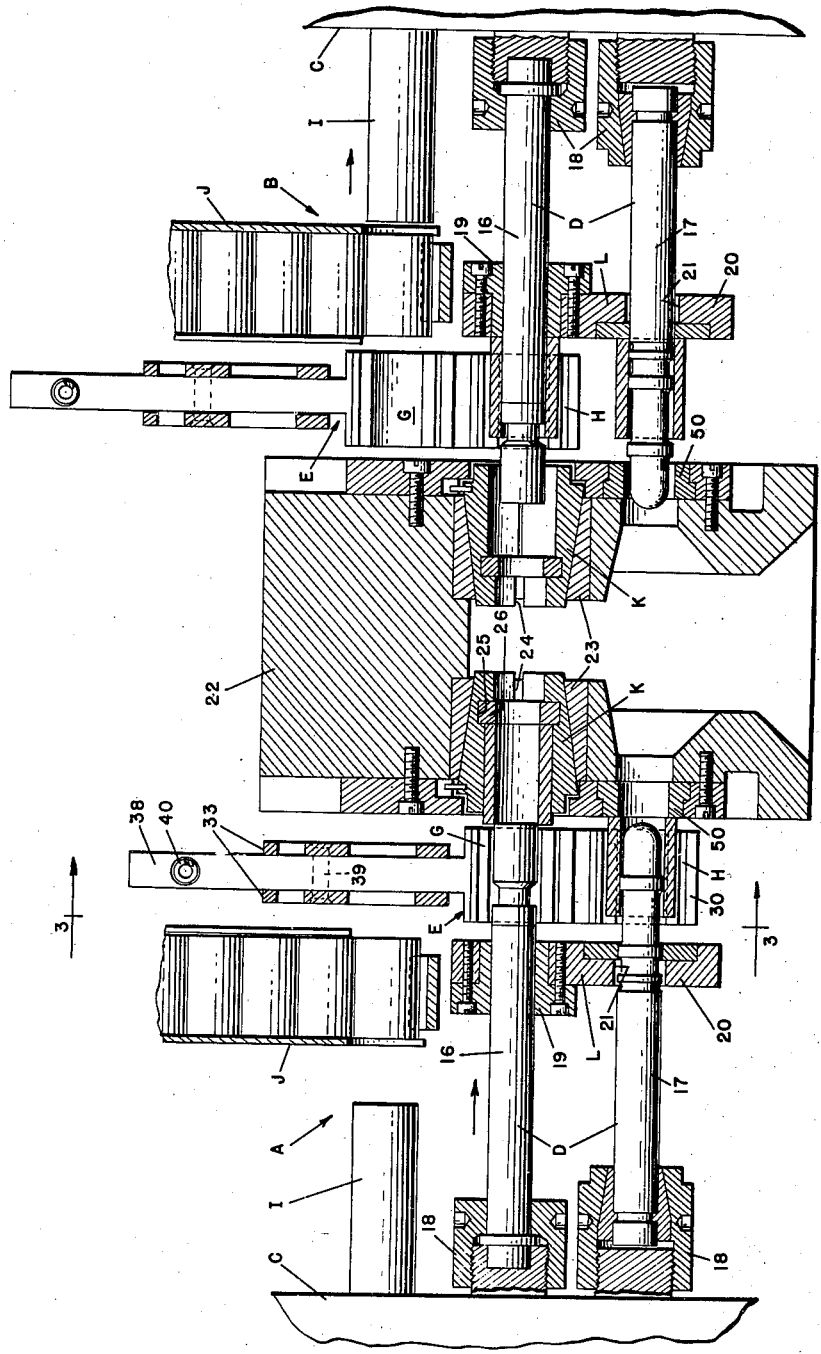
Figure 2 is a fragmentary longitudinal sectional view through a portion of the construction shown in Figure 1.
Figure 3:
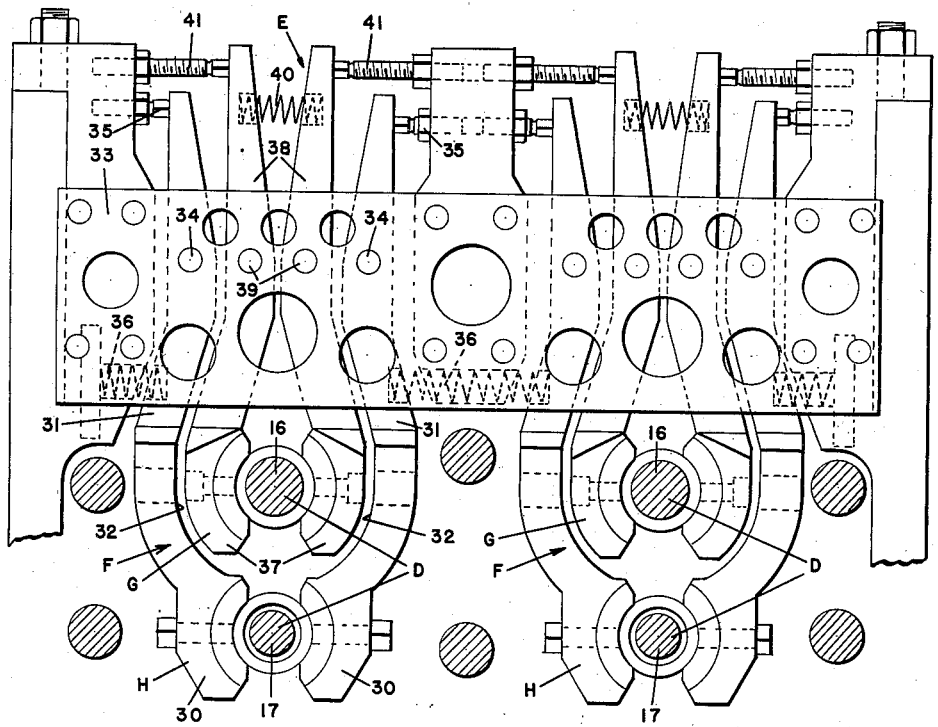
Figure 3 is a sectional view taken on the line 3—3 of Figure 2.

Referring now more in detail to the particular construction of the apparatus shown in Figures 1 to 3 inclusive, it will be noted that the reference character 10 designates generally the machine frame upon which the crossheads C are mounted in any suitable manner for sliding movement. The crosshead C of the broaching assembly A at the right-hand side of the machine, as viewed in Figure 1, is operatively connected to a crank shaft 11 through the medium of a connecting rod 12 and is also connected to the crossheads C of the broaching assembly B, by means of the rods 13, so that the crossheads are alternately moved into and out of operative relation by means of the common crank shaft 11. It will be observed from Figure 1, that the crank shaft 11 is suitably journaled in the frame of the machine and is driven by a drive shaft 14, through the medium of suitable gearing 15. The foregoing is preferably identical to the construction shown in my Patent No. 1,962,674, and accordingly, will not be described in detail herein.

In the present illustrative embodiment of the invention, each broach assembly A comprises two pairs of broaches D secured to the crossheads for movement therewith as a unit. The upper broach of each pair is designated in Figure 2 by the reference character 16 and is referred to herein as the roughing broach, while the lower broach of each pair is identified in the above figure by the reference character 17 and is termed the finishing broach. The outer ends of the broaches are removably secured to their respective crossheads C, through the medium of suitable collets 18, and the roughing broaches 16 of each assembly are slidably supported in bearings 19 carried by the stripper plates 20. The stripper plates 20 may be secured to the frame of the machine in the same manner as described in my above identified patent and, as will be observed from Figure 2, are apertured as at 21 to provide for extending the lower or finishing broaches 17 therethrough. By referring again to Figure 2, it will be noted that the broaches are secured to their respective crossheads in such a manner that the axes of the upper and lower broaches of each pair, not only lie in the same vertical plane, but are also substantially parallel to each other.

Fixedly secured to the frame 10 of the machine between the stripper plates 20 is a substantially vertically extending bolster member 22 having openings in opposite side walls in alignment with the broaches to provide for extending the inner ends of the broaches into the bolster as the crossheads C are moved toward the bolster. As shown in Figure 2, a sleeve 23 is secured in the bolster in registration with each of the roughing broaches 16 and the inner surface of each of the sleeves 23 is tapered to provide a seat for the work clamping sleeve K, briefly described above. The internal diameter of the sleeves K is preferably slightly less than the external diameter of the bushings to be broached, and the side walls of the sleeves K are provided with circumferentially spaced slots 24 permitting the slight expansion of the same required to force a bushing to be broached into the same. By reference to Figure 2, it will be noted that the sleeves K are provided with annular recesses 25 adjacent the inner ends thereof for receiving suitable stops 26 for the inner ends of the bushings. The stops are in the form of collars having a sufficient internal diameter to permit the inner ends of the broaches to be extended therethrough.

It has been previously stated that means is provided herein for successively introducing bushings from a source of supply into registration with the broaches of each pair. This is accomplished herein by providing each of the broaching assemblies A and B with a work holder E mounted for sliding movement in a substantially vertical plane on the bolster 22. As shown particularly in Figure 1, the work holder E for the assembly A is disposed between the stripper plate 20 of the latter assembly and the adjacent side of the bolster, while the work holder E for the assembly B is located in a similar position. Both of the holders are identical in construction, and accordingly, only one will be described in detail.

As previously stated, the work holder E comprises the two pairs of clamps F supported in such a manner that when the work holder is in its lowermost position shown in Figures 2 and 3, the upper clamps G of each pair register with the roughing broaches 16, while the lower clamps H of each pair register with the finishing broaches 17. Each of the pairs of clamps F are identical, and in the interest of simplicity, only one pair will be described. In detail, the lower clamp H comprises cooperating gripping jaws 30 carried by arms 31 having outwardly bowed portions intermediate the ends defining a space 32 of substantial area and having portions adjacent the upper ends pivotally supported between the plates 33 of the holder, by means of the pins 34. As will be observed from Figure 3, the upper extremities of the arms 31 project above the plates 33 and are normally urged outwardly into engagement with adjustable stops 35, by means of coil springs 36 supported by the plates 33 in a position to engage the arms 30 at points below the pivots 34. The arrangement is such that the springs 36 co-act with the arms 31 to yieldably urge the cooperating gripping jaws 30 in directions toward each other, and the extent of inward movement of the jaws by the springs is determined by the adjustable stops 35. In the present instance, the stops 35 are adjusted to not only insure effectively gripping a bushing between the jaws 30, but at the same time to provide the clearance between the jaws necessary for the passage of the broaches when the holder E is moved vertically with respect to the broaches.

The upper clamp of the pair previously described is also provided with cooperating gripping jaws 37 housed within the space 32 defined by the arms of the lower jaws 30, and also having arms 38 projecting upwardly between the plates 33 and pivotally supported on the latter by means of the pins 39. The extreme upper ends of the arms 38 are normally urged outwardly by means of a coil spring 40 into engagement with adjustable stops 41 similar in construction and purpose to the stops 35. In other words, the stops 41 are adjusted to permit the required inward movement of the jaws by the spring to effectively grip the bushing and at the same time provide the clearance between the jaws 37 necessary for the passage of the broaches upon vertical displacement of the holder E.

The extent of vertical stroke of the work holder E is equal to the distance between the axes of any one pair of cooperating broaches and the means for reciprocating the holder in timed relation to the operation of the broaches is preferably the same as shown in my above identified patent. It will, of course, be understood that inasmuch as the broach assembly B is being withdrawn as the broach assembly A is advanced, the tool holder of assembly A necessarily operates out of phase with the tool holder at assembly B. In other words, the tool holder at assembly A is reciprocated in timed relation to the operation of the broaches of assembly A, while the tool holder at assembly B is operated in timed relation to the reciprocation of the broaches at assembly B. The foregoing will be more readily apparent upon considering Figure 2, wherein the work holder E of assembly A is shown in its lowermost position with the clamps of each pair in registration with their respective broaches, and wherein the work holder of assembly B is in its uppermost position with the lower clamps registering with the roughing broaches 16, and with the upper clamps registering with the transfer plungers I at the loading stations.

The loading stations merely comprise the transfer plungers I and the associated bushing supply chutes J. The delivery end of each loading chute is positioned to register with the transfer plungers in the same manner as in my above identified patent, and since the particular construction of the chutes forms no part of the present invention, the same will not be described in detail. It will be noted, however, that the transfer plungers I are secured to the crossheads C for movement therewith as a unit, and the length of these plungers is so determined that they do not engage the bushings in the chutes until the bushings in the top clamps G are actually transferred into the sleeves K, or until the clamps G have assumed their uppermost positions in alignment with the transfer plungers.

Referring now to the operation of the broaching machine described above and assuming that the several parts are in the positions thereof shown in Figure 2, or in other words, assuming that the crosshead C has been moved inwardly a sufficient distance to transfer the bushings from the uppermost clamps G of the assembly A into the aligned sleeves K. During the aforesaid movement of the crosshead C of assembly A, the bushings in the lower clamps H are broached by the finishing broaches 17 and the broaches of assembly B are being returned to their outermost or inoperative positions. As soon as the bushings in the top clamps G of assembly A are transferred into the aligned sleeves by the inward movement of the roughing broaches 16, the work holder E of assembly A is moved to its uppermost position wherein the clamps G register with the transfer plungers I, and wherein the lower clamps H register with the roughing broaches 16. In this connection, attention is called to the fact that the aforesaid upward movement of the work holder is effected at the time the bushings in the clamps H are held into engagement with the backing members or stops 50 carried by the bolster 22, so that the clamps H may be snapped out of engagement with the bushings without displacing the latter. When the upper clamps G of assembly A are moved into registration with the transfer plungers I, the latter have been moved a sufficient distance inwardly to engage the bushings in the adjacent chutes J, so that upon continued inward movement of the broaches of assembly A, bushing blanks are transferred into the upper clamps G. Upon completion of the broaching operation of assembly A, the broaches D are returned to their outermost positions with the result that the bushings broached by the roughing broaches 16 are withdrawn by the latter from the sleeves K into the registering lower clamps H, and as soon as the broaches have been completely withdrawn the holder E of assembly A is moved to its lowermost position to register the new bushing blanks in the clamps G with the roughing broaches 16 and to register the previously broached bushings in the lower clamps H with the finishing broaches 17. It will, of course, be understood that during the interval the broaches of assembly A are moved to their outermost positions, the bushings finished by the broaches 17 are stripped from the latter by the plates 20 and permitted to fall by gravity into any siutable container (not shown). Incidentally, the location of the stripping plates 20 is such as to also strip the bushings from the roughing broaches 16 upon outward movement thereof to insure positioning the bushings in the lower clamps H. Although the instrumentalities of assembly B perform their operations at a different time than the corresponding instrumentalities of assembly A, nevertheless, these operations are exactly the same and, therefore, a detailed description of the function of assembly B is believed unnecessary.

Figure 4:
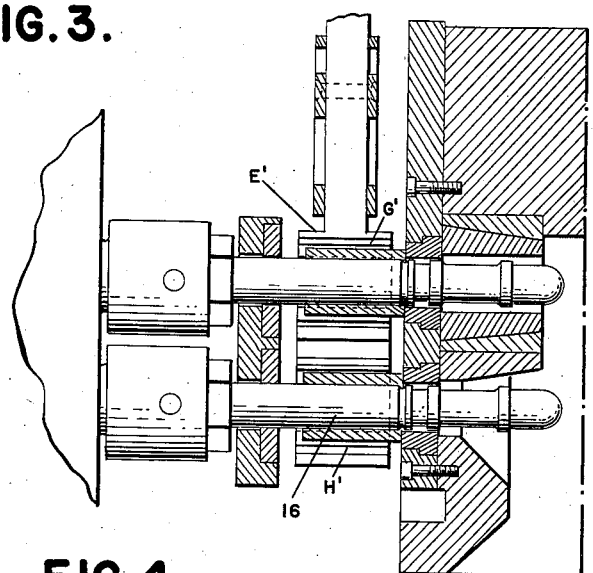
Figure 4 is a fragmentary sectional view illustrating a slightly modified form of construction.

Referring now to the modification illustrated in Figure 4, it will be noted that the essential difference between this embodiment of the invention and the one previously described is that the sleeves K are eliminated and the bushings are broached while held in abutting relation to the bolster. Inasmuch as considerable stress is exerted upon the bushings during the broaching operation, the work holder E' and associated clamps may be moved in the same manner as previously described without disturbing the positions of the bushings. In other words, as the work holder E' is moved upwardly during the broaching operation, the clamps G' and H' merely snap out of engagement with their respective bushings, and the lower clamps H' snap into engagement with the bushings being broached by the roughing broaches 16'. With the above exception, the above modified form of construction operates in the same manner as the one previously described and, consequently, this modification will not be described in detail.

From the foregoing, it will be observed that I have provided a broaching machine which is completely automatic in operation and which is capable of roughing and finishing a plurality of bushing blanks simultaneously. It will further be apparent that the means for transferring bushings from the source of supply and for successively registering the bushings with the several broaches function during the broaching operations so that the time interval required to completely broach a single bushing is reduced to the minimum.

What I claim as my invention is:

1. In a machine for broaching bushings and like members, a sleeve adapted to receive a member to be broached and to hold said member during the broaching operation, a work holder having means for holding a member to be broached in alignment with said sleeve, and a broach also supported in alignment with the sleeve for movement toward and away from the latter and operable upon initial movement of the broach toward the sleeve to transfer the member from the work holder into said sleeve.

2. In a machine for broaching bushings and like members, a pair of broaches mounted for reciprocation, a pair of movable work engaging clamps operable in one position to hold a member to be broached in registration with each of said broaches, a fixture supported in alignment with one of the broaches for receiving the member in the associated work engaging clamp upon movement of the broaches in directions to engage the members in the work engaging clamps, means carrying said clamps operable during the broaching operation to move the clamps in a direction to disalign the clamp opposite the fixture from the associated broach and to align the other clamp with said fixture, and means operable upon withdrawal of the broaches to strip the member from the last named broach into the last mentioned clamp.

3. In a machine for broaching bushings and like members, a broach mounted for reciprocation in the direction of its axis, a second broach spaced from the broach aforesaid and also mounted for reciprocation as a unit with the first broach, a pair of movable work holding clamps operable in one position to register a member to be broached with each of said broaches for engagement by the latter upon movement of the same in one direction, a fixture supported in alignment with the first broach to receive the member in the associated clamp upon movement of the first broach in a direction toward said clamp and for holding the member during the broaching operation, means carrying the clamps operable during the broaching operation to move the clamps in a direction to disalign the clamp associated with the first broach from the latter and to align the other clamp with the first broach, and means operable upon withdrawal of the broaches to strip the members from both broaches and to position the member on the first broach into the registering clamp, said clamp carrying means also operable upon completion of the stripping operation to move the clamps to their original position aforesaid wherein the member previously operated on by the first broach is aligned with the second broach.

4. In a machine for broaching bushings and like members, a loading station, a fixture adapted to receive a member to be broached and to hold the member during the broaching operation, a pair of movable clamps operable in one position to align one of the clamps with the fixture, a broach supported in alignment with the fixture for movement toward and away from the member in the clamp aligned with the fixture, said broach operable upon movement toward the latter clamp to transfer the member therein into the fixture prior to broaching said member, a second broach supported in alignment with the other clamp and movable as a unit with the first broach, means carrying the clamps operable during the broaching operation to move the clamps to a position wherein the clamp for the second broach registers with the first broach and the clamp for the latter registers with the loading station, means operable upon continued operation of the broaches to transfer a member from the loading station into the clamp associated therewith, and means operable in dependence upon return movement of the broaches to strip the members from the broaches and to position the member on the first broach into the registering clamp.

5. In a machine for broaching bushings and like members, a loading station, a fixture adapted to receive a member to be broached and to hold the member during the broaching operation, a pair of movable clamps operable in one position to align one of the clamps with the fixture, a broach supported in alignment with the fixture for movement toward and away from the member in the clamp aligned with the fixture, said broach operable upon movement toward the latter clamp to transfer the member therein into the fixture prior to broaching said member, a second broach supported in alignment with the other clamp and movable as a unit with the first broach, means carrying the clamps operable during the broaching operation to move the clamps to a position wherein the clamp for the second broach registers with the first broach and the clamp for the latter registers with the loading station, means operable upon continued operation of the broaches to transfer a member from the loading station into the clamp associated therewith, and means operable in dependence upon return movement of the broaches to strip the members from the broaches and to position the member on the first broach into the registering clamp, said clamp carrying means operable in dependence upon completion of the stripping operation to return the clamps to their original aforesaid positions.

6. In a machine for broaching bushings and like members, a loading station, a pair of work engaging clamps for holding the work to be broached, a pair of broaches movable into and out of engagement with the members supported by the clamps, means carrying the clamps operable during the broaching operation to move the clamps to a position wherein the clamp associated with one of the broaches registers with the loading station and wherein the clamp associated with the other broach registers with the aforesaid broach, and means operable in dependence upon movement of the broaches in a direction away from the clamps to strip the members from the broaches and to position the member on the first broach into the clamp registering therewith.

7. In a machine for broaching bushings and like members, a loading station, a pair of work engaging clamps for holding the work to be broached, a pair of broaches movable into and out of engagement with the members supported by the clamps, means carrying the clamps operable during the broaching operation to move the clamps to a position wherein the clamp associated with one of the broaches registers with the loading station and wherein the clamp associated with the other broach registers with the aforesaid broach, means at the loading station operable in timed relation to the movement of the clamps to the aforesaid position to transfer a member from the loading station into the clamp registering therewith, and means operable in dependence upon movement of the broaches in a direction away from the clamps to strip the members from the broaches and to position the member on the first named broach into the registering clamp.

8. In a broaching machine, a bolster provided in one side wall thereof with a work holder and a work stop, said holder and stop being substantially in vertical alignment, work holding means movable vertically beside the wall aforesaid of the bolster to points opposite the work holder and work stop, means including a loading plunger for transferring work from a suitable source to said holding means, a broach of one type initially engageable with work in the holding means when it is opposite the work holder, and another type of broach subsequently engageable with the work when it is opposite the work stop.

9. In a broaching machine, a bolster provided in one side wall thereof with a work holder and a work stop, work holding means movable beside the wall aforesaid of the bolster to points opposite the work holder and work stop, means including a loading plunger for transferring work from a suitable source to the holding means, a broach of one type initially engageable with work in the holding means when it is opposite the work holder, and another type of broach subsequently engageable with the work when it is opposite the work stop, and means for moving said plunger and two broaches in unison toward said bolster so that the work at the transfer and two broaching points respectively will be engaged simultaneously by the plunger and two broaches.

10. In a broaching machine, a bolster provided in one side wall thereof with a work stop apertured for the passage therethrough of a work engaging broach, a work stripper plate spaced from said side wall of the bolster, a work engaging broach movable through said stripper plate and work stop, and work holding means mounted for vertical movement between the bolster and stripper plate in timed relation to the work engaging broach, said means being provided with vertically spaced work gripping means adapted upon vertical movement of the work holding means to alternately position work in line with the work stop for engagement by the broach aforesaid.

11. In a broaching machine, a work holder having substantially parallel plates, upper and lower clamps, the lower clamp comprising cooperating gripping jaws having upwardly extending arms between said parallel plates, portions of said arms adjacent said jaws being outwardly bowed and defining a space of substantial area, portions of said arms adjacent their upper ends being pivotally connected to said parallel plates, the upper extremities of said arms projecting above said parallel plates, coil springs carried by said parallel plates below the pivots for the arms and urging the upper extremities of said arms apart so that the jaws will be moved toward each other, stops for the upper extremities of said arms, said stops being adjustable so that the movement of the jaws toward each other may be varied, the upper clamp having cooperating gripping jaws housed within the space defined by the arms of the lower jaws, said last mentioned jaws having upwardly extending arms between and pivotally connected to the parallel plates at points between the arms of the lower jaws, the upper extremities of the arms of the upper jaws projecting above said parallel plates, a coil spring between and urging the upper extremities of the arms of the upper jaws apart, and adjustable stops for the upper extremities of the arms of the upper jaws.

12. In a broaching machine, a bolster member having openings in opposite side walls thereof for the reception of reciprocating broaches, sleeves fixed in said openings and having tapered inner surfaces, work clamping sleeves engaging said tapered inner surfaces, the internal diameter of each work clamping sleeve being slightly less than the external diameter of the work to be broached, the side walls of said work clamping sleeves being provided with circumferentially spaced slots permitting slight expansion of the said sleeves, said work clamping sleeves also having annular recesses therein adjacent their inner ends, and collars within said annular recesses forming stops or abutments for the work in the work clamping sleeves, the internal diameter of said collars being sufficient to permit the inner ends of the reciprocating broaches to be extended therethrough.

13. In a broaching machine, a pair of spaced cross heads, vertically spaced work engaging broaches projecting from the opposed faces of said cross heads, one broach on each cross head being a roughing broach, another broach on each cross head being a finishing broach, a stationary member between said cross heads, vertically spaced work engaging means at opposite sides of said member, work chutes between said member and cross heads, work holding means between said member and chutes, and plungers carried by the cross heads for transferring work from the chutes to the holding means, the axis of each plunger being spaced above the axis of the uppermost broach a distance substantially equal to the spacing between the vertically spaced broaches, so that when one part of each work holding means is in proper position relative to the adjacent work engaging means another part of each work holding means is in proper position relative to each plunger.

14. In a broaching machine, a work holder having upper and lower clamps, the lower clamp comprising cooperating gripping jaws having upwardly extending arms, portions of said arms adjacent said jaws being outwardly bowed and defining a space of substantial area, stops for the upper extremities of said arms, said stops being adjustable so that the movement of the jaws toward each other may be varied, the upper clamp having cooperating gripping jaws housed within the space defined by the arms of the lower jaws, said last mentioned jaws having upwardly extending arms between the arms of the lower jaws, a coil spring between and urging the upper extremities of the arms of the upper jaws apart, and adjustable stops for the upper extremities of the arms of the upper jaws.

15. In a broaching machine, a bolster member having an opening in one side thereof for the reception of a reciprocating broach, a sleeve fixed in said opening and having a tapered inner surface, a work clamping sleeve engaging said tapered inner surface, the internal diameter of said work clamping sleeve being slightly less than the external diameter of the work to be broached, the side walls of said work clamping sleeve being provided with circumferentially spaced slots to permit slight expansion of said sleeve, said work clamping sleeve also having an annular recess therein adjacent its inner end, and a collar within said annular recess forming a stop or abutment for the work in said work clamping sleeve, the internal diameter of said collar being sufficient to permit the inner end of the reciprocating broach to be extended therethrough.

16. In a broaching machine, a pair of spaced cross heads mounted to reciprocate in substantially a horizontal plane, a stationary upright member between said cross heads and provided at opposite sides thereof with recesses, work clamping sleeves within said recesses, collars anchored within said sleeves and constituting abutments for the work, the internal diameter of said collars being sufficient to permit the outer ends of work engaging broaches to be extended therethrough, means for delivering work to points in stepped relation to said sleeves, means for receiving work from the delivery means and for positioning the same in line with said sleeves, means carried by said cross heads for transferring work from the delivery means to said receiving means, broaches projecting from the opposed faces of said cross heads having means operable upon the forward stroke thereof to move the work from the receiving means into said sleeves against said abutments and having means for broaching the work while in said sleeves, and means between the receiving means and cross heads for stripping work from the broaches upon the return stroke thereof.

17. In a broaching machine, a pair of spaced cross heads mounted to reciprocate in substantially a horizontal plane, a bolster between said cross heads and provided in opposite sides thereof with work holders and work stops within said holders and apertured for the passage therethrough of work engaging broaches, work stripper plates spaced from the sides aforesaid of the bolster, work engaging broaches carried by said cross heads and movable through said stripper plates, work holders and work stops, and work gripping means mounted for vertical movement between the bolster and stripper plates in timed relation to the work engaging broaches, said gripping means being provided with vertically spaced cooperating jaws adapted upon vertical movement of the work gripping means to alternately position work in line with the work holders for engagement by the work engaging broaches.

18. In a machine of the class described, a work holder comprising a pair of spaced plates, and upper and lower clamps suspended from said plates, the upper clamps having cooperating jaws provided with arms extending upwardly between and pivotally connected intermediate their ends to said plates, the lower clamps having cooperating jaws provided with arms extending upwardly between and pivotally connected intermediate their ends to said plates, portions of the last mentioned arms being bowed to receive therebetween the jaws of the upper clamp, adjustable stops for the arms of the upper jaws, a coil spring extending between the arms of the upper jaws above their pivots for maintaining said arms against said stops, adjustable stops for the arms of the lower jaws, and coil springs carried by said plates and engaging the arms of the lower jaws below their pivots for maintaining said arms against their stops.

19. In a broaching machine, a pair of spaced cross heads mounted to reciprocate in substantially a horizontal plane, work engaging broaches projecting from the opposed faces of said cross heads, a stationary upright member between said cross heads and provided at opposite sides thereof with recesses for receiving the outer ends of said broaches, work clamping sleeves within said recesses and also adapted to receive the outer ends of said broaches, and collars anchored within said sleeves and constituting abutments for the work, the internal diameter of said collars being sufficient to permit the outer ends of the work engaging broaches to be extended therethrough.

20. In a machine of the class described, a work holder comprising a pair of spaced supporting members, and upper and lower clamps suspended from said members, the upper clamps having cooperating jaws provided with arms extending upwardly between and pivotally connected intermediate their ends to said members, the lower clamps having cooperating jaws provided with arms extending upwardly between and pivotally connected intermediate their ends to said members, portions of the last mentioned arms being bowed to receive therebetween the jaws of the upper clamps, adjustable stops for the arms of the upper jaws, means for maintaining said arms against said stops, adjustable stops for the arms of the lower jaws, and means for maintaining the last mentioned arms against their stops.

21. In a machine of the class described, a work holder comprising a pair of spaced supporting members, and upper and lower clamps suspended from said members, the upper clamps having cooperating jaws provided with arms extending upwardly between and pivotally connected intermediate their ends to said members, the lower clamps having cooperating jaws provided with arms extending upwardly between and pivotally connected intermediate their ends to said members, portions of the last mentioned arms being bowed to receive therebetween the jaws of the upper clamps, adjustable stops for the arms of the upper jaws, yieldable means above the pivots for the upper jaws for maintaining the arms of the upper jaws against said stops, adjustable stops for the arms of the lower jaws, and yieldable means below the pivots for the lower jaws for maintaining the arms of the lower jaws against their stops.

GEORGE F. YAGER.